(12) United States Patent
Lockwood et al.

(10) Patent No.: US 8,412,609 B2
(45) Date of Patent: Apr. 2, 2013

(54) REGIME-BASED ASSET ALLOCATION VIA ADAPTIVE RISK PREMIUM

(75) Inventors: Theodore James Lockwood, Newark, NJ (US); John A. Hudock, Newark, NJ (US)

(73) Assignee: Quantitative Management Associates LLC, Newark, NJ (US)

( * ) Notice: Subject to any disclaimer, the term of this patent is extended or adjusted under 35 U.S.C. 154(b) by 95 days.

(21) Appl. No.: 12/890,172

(22) Filed: Sep. 24, 2010

(65) Prior Publication Data

US 2012/0078811 A1    Mar. 29, 2012

(51) Int. Cl.
*G06Q 40/00*      (2012.01)
(52) U.S. Cl. ........... 705/36 R; 705/35; 705/36 T; 705/2; 705/37; 705/1.1
(58) Field of Classification Search .................. 705/1.1, 705/36, 36 R, 35, 36 T, 37, 2, 38, 28; 706/15; 235/383
See application file for complete search history.

(56) References Cited

U.S. PATENT DOCUMENTS

2009/0281959 A1* 11/2009 Abidi et al. .................. 705/36 R

OTHER PUBLICATIONS

"International Asset Allocation with Regime Shifts" By: Andrew Ang & Geert Bekacrt, Columbia University and NBER, First Version: Mar. 12, 1999 This Version: May 30, 2001.*
Guidolin, M. and Timmermann, A.; "Size and Value Anomalies under Regime Shifts", Journal of Financial Economics, vol. 6, Issue 1, Sep. 1, 2008 (39 pages).
Ghysels, E.; "A Time Series Model With Periodic Stochastic Regime Switching", Discussion Paper 84, Institute for Empirical Macroeconomics Federal Reserve Bank of Minneapolis, Montreal, May 1, 1993 (55 pages).
Ghysels, E., McCulloch, R., Tsay, R.; "Bayesian Inference for Periodic Regime-Switching Models", Cirano, Centre interuniversitaire de recherche en analyse des organisations, No. 94s-15, Montreal, Nov. 1, 1994 (21 pages).
Ang, A. and Bekaert, G.; "How do Regimes Affect Asset Allocation?", Columbia University and NBER, Columbia, Apr. 30, 2002 (35 pages).
Ang, A. and Bekaert, G.; "International Asset Allocation with Regime Shifts", Columbia University and NBER, Columbia, May 30, 2001 (66 pages).
Ang, A. and Bekaert, G.; "Regime Switches in Interest Rates", Stanford University and NBER, Mar. 25, 1998 (70 pages).
AllianceBernstein Quarterly Report, US Large Cap Value Equities, Portfolio Performance, 1Q, Jan. 1, 2009 (1 page).

* cited by examiner

*Primary Examiner* — John H Holly
(74) *Attorney, Agent, or Firm* — Osha Liang LLP (57) ABSTRACT

A method for identifying a regime-based asset allocation via an adaptive risk premium (ARP) involves receiving a financial data; receiving financial parameters; generating an ARP; determining risk regimes; calculating an expected return and a covariance matrix of assets; calculating a number of calculated weights for each risk regime; determining a current risk regime; determining a number of asset weights of a current portfolio; adjusting the asset weights of the current portfolio to match the calculated weights for the current risk regime; calculating a momentum, volatility, and a correlation (MVC) for each of the asset classes of the current portfolio; ranking each asset class of the current portfolio; adjusting the first adjusted asset weights of the current portfolio; determining one of the second adjusted asset weights for the current portfolio; and generating an investment portfolio based on one of the second adjusted asset weights for the current portfolio.

20 Claims, 5 Drawing Sheets

REGIME-BASED ASSET ALLOCATION VIA ADAPTIVE RISK PREMIUM

BACKGROUND

Many individuals, groups, institutions, and corporate entities invest money in various assets in the hope of making a return on their investment. Every investment has some degree of risk, which reflects the probability that some or all of an investment will not be recovered. Some assets have very little risk, while others pose a high degree of risk. Generally speaking, the higher the risk, the better the chance of a higher return on investment, even if that chance of a higher return is relatively small. To manage the risk associated with investments that have the potential for higher returns, some investors diversify their investments into a portfolio. Diversification generally means combining assets which have low correlation to each other.

Risk and correlations of assets may change over time. As such, diversification using static estimates of correlation is not always a safe strategy. Diversification, and oftentimes investment strategies in general, rely on a long-term view of the market. Dynamic moves in the marketplace may have implications that affect a wide range of investment types or asset classes. These dynamic moves may be caused by domestic events or worldwide events. These dynamic moves may cause a paradigm shift in investment principles for an asset class, which may change an asset class from low risk to high risk or vice-versa.

SUMMARY

In general, in one aspect, the invention relates to a method for identifying a regime-based asset allocation via an adaptive risk premium. The method includes receiving a plurality of financial data associated with a plurality of financial markets, and receiving a plurality of financial parameters. The method further includes generating, based on the plurality of financial data and using a central processing unit (CPU), an adaptive risk premium using an adaptive risk premium model, and determining, using the CPU, a plurality of risk regimes using the adaptive risk premium. The method further includes calculating, for each risk regime of the plurality of risk regimes, an expected return and a covariance matrix of assets, and calculating a plurality of calculated weights for each risk regime using the plurality of financial parameters and the plurality of financial data. The method further includes determining, based on the plurality of financial data and using the CPU, a current risk regime of the plurality of risk regimes, and determining, using the CPU, a plurality of asset weights of a current portfolio comprising a plurality of asset classes. The method further includes adjusting, using the CPU, the plurality of asset weights of the current portfolio to match the plurality of calculated weights for the current risk regime to create a first adjusted plurality of asset weights, and calculating a momentum, volatility, and a correlation (MVC) for each asset class of the plurality of asset classes of the current portfolio. The method further includes ranking, using the CPU, each asset class of the current portfolio by the MVC, and adjusting, based on the MVC and using the CPU, the first plurality of adjusted asset weights of the current portfolio to create a second plurality of adjusted asset weights. The method further includes determining, using the CPU, one of the second plurality of adjusted asset weights for the current portfolio, and generating an investment portfolio based on the one of the second plurality of adjusted asset weights for the current portfolio.

In general, in one aspect, the invention relates to a system for identifying a regime-based asset allocation via an adaptive risk premium (ARP). The system includes memory, a central processing unit (CPU), a risk regime module, an ARP model, a financial parameter calculator, and a momentum, volatility, and correlation (MVC) module. The memory is configured to store software instructions. The CPU is configured to execute the software instructions. The risk regime module is configured to execute on the CPU and is adapted with functionality to receive a plurality of financial data from a plurality of financial data sources, and determine a plurality of risk regimes using an adaptive risk premium. The risk regime module is further adapted with functionality to calculate, for each risk regime of the plurality of risk regimes, an expected return and a covariance matrix of assets, and calculate a plurality of calculated weights for each risk regime of the plurality of risk regimes using a plurality of financial parameters and the plurality of financial data. The risk regime module is further adapted with functionality to determine, based on the plurality of financial data, a current risk regime of the plurality of risk regimes, and determine a plurality of asset weights of a current portfolio. The risk regime module is further adapted with functionality to adjust the plurality of asset weights of the current portfolio to match the plurality of calculated weights of the current risk regime to create a first plurality of adjusted asset weights, determine one of a second plurality of adjusted asset weights for the current portfolio, and generate, based on the one of the second plurality of adjusted asset weights for the current portfolio, an investment portfolio. The ARP model comprises an ARP generator configured to execute on the CPU and is adapted with functionality to receive the plurality of financial data from the risk regime module. The ARP model is further adapted with functionality to generate the adaptive risk premium using the plurality of financial data, and send the adaptive risk premium to the risk regime module. The financial parameter calculator is configured to execute on the CPU and is adapted with functionality to calculate the plurality of financial parameters for each risk regime of the plurality of risk regimes, and send the plurality of financial parameters to the risk regime module. The MVC module comprises a portfolio weight module and is configured to execute on the CPU. The MVC module is adapted with functionality to calculate MVC for each asset class of the current portfolio, and rank each asset class by the MVC. The MVC module is further adapted with functionality to adjust, based on ranking each asset class by the MVC and using the portfolio weight module, the first plurality of adjusted asset weights to create the second plurality of adjusted asset weights, and send the second plurality of adjusted asset weights to the risk regime module.

In general, in one aspect, the invention relates to a computer readable storage medium comprising computer readable program code embodied therein for performing a method of identifying a regime-based asset allocation via an adaptive risk premium. The method includes receiving a plurality of financial data associated with a plurality of financial markets, and receiving a plurality of financial parameters. The method further includes generating, based on the plurality of financial data, an adaptive risk premium using an adaptive risk premium model, and determining a plurality of risk regimes using the adaptive risk premium. The method further includes calculating, for each risk regime of the plurality of risk regimes, an expected return and a covariance matrix of assets, and calculating a plurality of calculated weights for each risk regime using the plurality of financial parameters and the plurality of financial data. The method further includes determining, based on the plurality of financial data, a current risk regime of the plurality of risk regimes, and determining a plurality of asset weights of a current portfolio comprising a plurality of asset classes. The method further includes adjusting the plurality of asset weights of the current portfolio to match the plurality of calculated weights for the current risk regime to create a first adjusted plurality of asset weights, and calculating a momentum, volatility, and a correlation (MVC) for each asset class of the plurality of asset classes of the current portfolio. The method further includes ranking each asset class of the current portfolio by the MVC, and adjusting, based on the MVC, the first plurality of adjusted asset weights of the current portfolio to create a second plurality of adjusted asset weights. The method further includes determining one of the second plurality of adjusted asset weights for the current portfolio, and generating an investment portfolio based on the one of the second plurality of adjusted asset weights for the current portfolio.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for allocating regime-based assets using an adaptive risk premium. More specifically, one or more embodiments of the invention provide a method and system for generating an investment portfolio based on an adjusted set of weights for a portfolio. In one or more embodiments of the invention, the weights for the portfolio are continuously monitored and adjusted based on a change in market conditions. The investment portfolio may be generated for a client, which may include but is not limited to an individual, a trust, a fund or other commingled investment vehicle, a corporation, a financial advisor, a consultant, or any other suitable entity that may use the investment portfolio.

In one or more embodiments of the invention, an investment portfolio (also sometimes referred to simply as a portfolio) is a collection of investments, where each investment falls within an appropriate risk regime and is assigned a weight within the portfolio. The weight may determine a percentage of money invested into the portfolio that is allocated to buy an investment associated with a weight. For example, if a particular investment in the portfolio has a weight of 30%, then for every dollar invested into the portfolio, thirty cents is used to buy the particular investment. An investment may be any asset that can be purchased and sold. An investment may be part of an asset class, which is a type of investment. Examples of an asset class include, but are not limited to, stocks, bonds, real estate investment trusts (REITS), precious metals, and certificates of deposit (CDs). Certain assets may be called real assets, which means that they historically perform well (from a return-on-investment perspective) during periods of high inflation.

Figure 1:
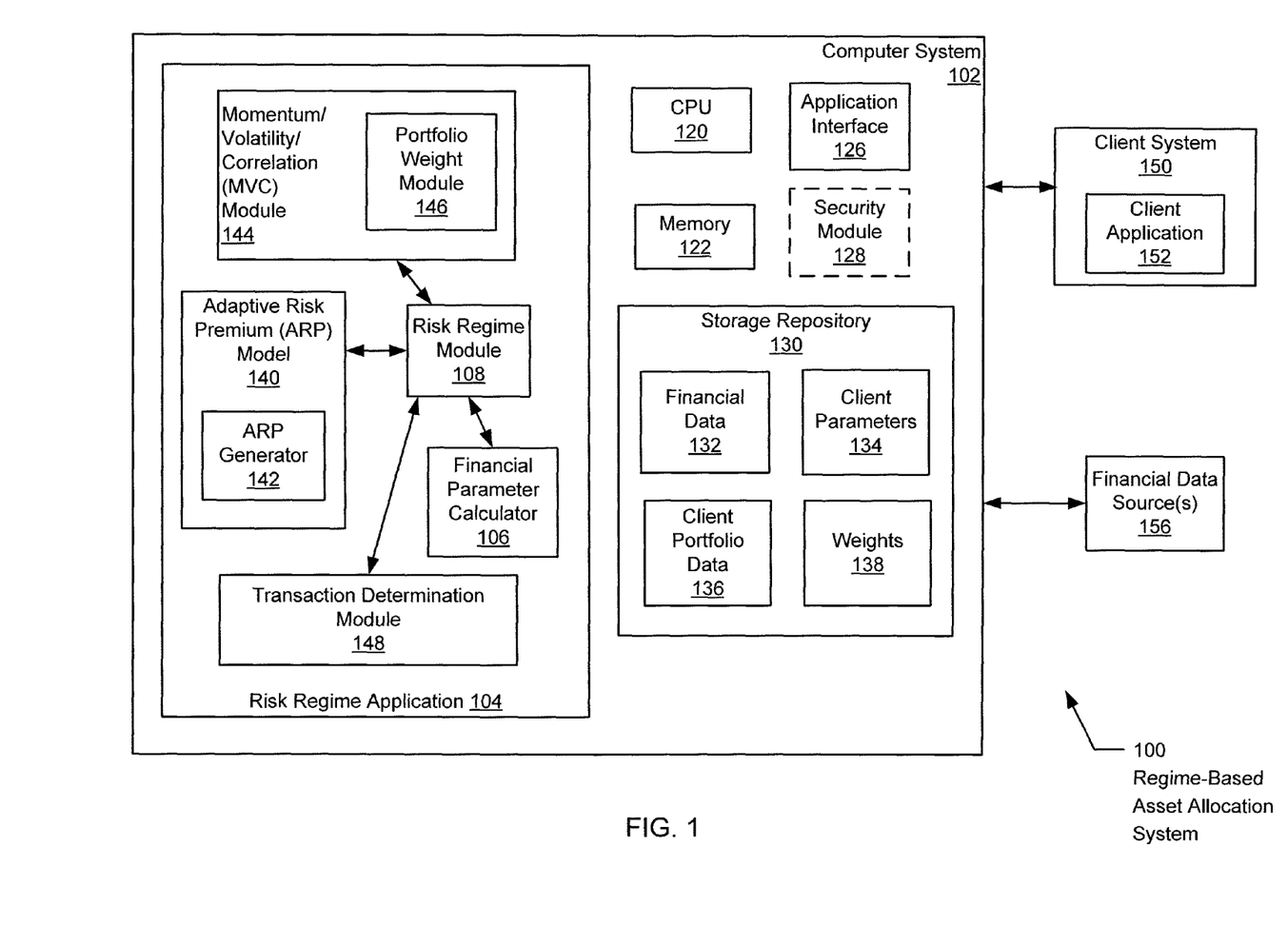
FIG. 1 shows a diagram of a regime-based asset allocation system in accordance with one or more embodiments of the invention.

FIG. 1 shows a diagram of a regime-based asset allocation system (100) in accordance with one or more embodiments of the invention. The regime-based asset allocation system (100) includes a computer system (102), a client system (150), and one or more financial data sources (156). The computer system (102) includes a risk regime application (104), a storage repository (130), a central processing unit (CPU) (120), memory (122), an application interface (126), and, optionally, a security module (128). The risk regime application (104) includes a risk regime module (108), a financial parameter calculator (106), an adaptive risk premium (ARP) model (140), a momentum/volatility/correlation (MVC) module (144), and a transaction determination module (148). The ARP module (140) includes an ARP generator (142). The MVC module (144) includes a portfolio weight module (146). The storage repository (130) includes financial data (132), client parameters (134), client portfolio data (136), and weights (138). The client system (150) includes a client application (152). Each of these components is described below. One of ordinary skill in the art will appreciate that embodiments of the invention are not limited to the configuration shown in FIG. 1.

In one or more embodiments of the invention, the client system (150) is configured to interact with the computer system (102) using the client application (152). More specifically, a client (not shown) may be an entity using the client system (150) that includes the client application (152). The client system (150) may be, or may contain a form of, an internet-based or an intranet-based communication device that is capable of communicating with the client application (152). Examples of a client system (150) include, but are not limited to, a desktop computer with internet or intranet access, a laptop computer with internet or intranet access, a smart phone, and a personal digital assistant (PDA). Data (e.g., client parameters) provided by the client system (150) may be provided to the computer system (102) through an automatic data transfer, in response to a request for data made to the client system, through manual entry, or by some other suitable transfer of the data. The client system (150) may be operated by the client, which may include, but is not limited to, an individual, a group, an organization, or some other legal entity. One skilled in the art will appreciate that an interface with the client system (150) may be provided by, accessed through, and/or built by a third party.

In one or more embodiments of the invention, the client application is configured to display web page(s) (i.e., web content). More specifically, the client application (152) may be any application capable of rendering Hypertext Markup Language (HTML). For example, the client application (152) may be a web browser(s) used by the client system (150) to access web pages (i.e., web content) over the Internet (or other Wide Area Network or Local Area Network). The client application (152) may also be configured to display data in other formats, including but not limited to JavaScript®, JavaScript® Object Notation (JSON) and Extensible Markup Language (XML). (JavaScript is a registered trademark and service mark of Oracle America, Inc. of Redwood Shores, Calif.) The client application (152) may be executing on the client system (150). Further, in one or more embodiments of the invention, the computer system (102) is configured to interact with the client system (150) through use of notifications. The notifications may be conveyed by electronic mail, short message service (SMS), alert boxes, pop-up windows, persistent to-do items, or some other form of electronic correspondence.

In one or more embodiments of the invention, the client application (152) provides support for browser extension(s). More specifically, the client application (152) may provide an open framework for adding features to the client application (152). In this case, a browser extension may be an application that extends the functionality of a client application (152) using the open framework. The client application (152) may interact with the computer system (102) using the browser extension(s). Further, the browser extension(s) may be configured to interact with a user interface (not shown) of the client application.

In one or more embodiments of the invention, one or more financial data sources (156) are configured to interact with the computer system (102) using a financial data source application (not shown). A financial data source (e.g., financial data source (156)) may include, but is not limited to, an individual, a news source, a government agency, a financial exchange, a consultant, a research firm, a corporation, a broker, a data warehouse, a data provider, or any other entity involved in creating, calculating, aggregating, or otherwise working with financial data and/or financial parameters. Financial data provided by a financial data source (e.g., financial data source (156)) may be provided to the computer system (102) through an automatic data transfer, in response to a request for the financial data made to the financial data source, through manual entry, or by some other suitable transfer of the financial data. Each financial data source may be configured to provide financial data to the computer system (102). One skilled in the art will appreciate that an interface with a financial data source (156) may be provided by, accessed through, and/or built by a third party.

The one or more financial data sources (156) may be an entity using a financial data source system (not shown) that includes the financial data source application. The financial data source system may be, or may contain a form of, an internet-based or an intranet-based communication device that is capable of communicating with the financial data source application. Examples of a financial data source system include, but are not limited to, a desktop computer with internet or intranet access, a laptop computer with internet or intranet access, a smart phone, and a personal digital assistant (PDA). The financial data source system may be operated by a financial data source (156).

In one or more embodiments of the invention, the financial data source application is configured to display web page(s) (i.e., web content). More specifically, the financial data source application is any application capable of rendering Hypertext Markup Language (HTML). For example, the financial data source application may be a web browser(s) used by the financial data source system to access web pages (i.e., web content) over the Internet (or other Wide Area Network or Local Area Network). The financial data source application may be executing the financial data source system. Further, in one or more embodiments of the invention, the computer system (102) is configured to interact with the financial data source system through use of notifications. The notifications may be conveyed by electronic mail, short message service (SMS), or some other form of correspondence.

In one or more embodiments of the invention, the financial data source application provides support for browser extension(s). More specifically, the financial data source application may provide an open framework for adding features to the financial data source application. In this case, a browser extension may be an application that extends the functionality of a financial data source application using the open framework. The financial data source application may interact with the computer system (102) using the browser extension(s). Further, the browser extension(s) may be configured to interact with a user interface of the financial data source application.

Those skilled in the art will appreciate that the computer system (102) may also be implemented as a browser extension. In this case, the client application (152) of the client system (150) and/or an application of a financial data source (156) may interact directly with the computer system (102) as a browser extension.

In one or more embodiments of the invention, the computer system (102) is configured to interact with each financial data source (156) and the client application (152) of the client system (150) using an application interface (126). Specifically, the application interface (126) of the computer system (102) is configured to receive input from and send output to a financial data source (156)) and the client application (152) of the client system (150). In one or more embodiments of the invention, the information received by the application interface (126) is financial data, client parameters, and/or financial parameters. The information sent by the application interface (126) may be an investment portfolio and/or asset weights. The application interface (126) may receive information from a financial data source (156), which may include but is not limited to a client using the client system (150), a finance software package, a bank, a lending institution, an entity capable of valuing an asset, or any other entity with financial data, client parameters, and/or financial parameters. The information sent by the application interface (126) may specify, but is not limited to, a client, a Uniform Resource Identifier (URI) (e.g., a Uniform Resource Locator (URL), a web address, etc.), an investment portfolio generated by the risk regime application (104), some other financial information, or any suitable combination thereof The application interface (126) may also send information to the client application (152) and/or a financial data source application. The information sent by the application interface (126) may be a dynamic notification, a request, a report, a portfolio, or some other communication.

In one or more embodiments of the invention, the data transferred among the application interface (126), the client application (152), and/or a financial data source application corresponds to metadata associated with financial data, client parameters, financial parameters, and/or an investment portfolio. Optionally, the data transferred may also include additional metadata describing the data specified in the financial data, client parameters, financial parameters, and/or an investment portfolio (i.e., the additional metadata may provide context for the specified data.) In one or more embodiments of the invention, the computer system (102) is configured to support various data formats provided by the client application (152) and/or the financial data source application.

In one or more embodiments of the invention, the computer system (102) is configured to retrieve and store financial data (132), client parameters (134), client portfolio data (136), and weights (138). More specifically, the computer system (102) may be configured to use the risk regime module (108) of the risk regime application (104) to retrieve and store financial data (132), client parameters (134), client portfolio data (136), and weights (138) in the storage repository (130).

Figure 2A:
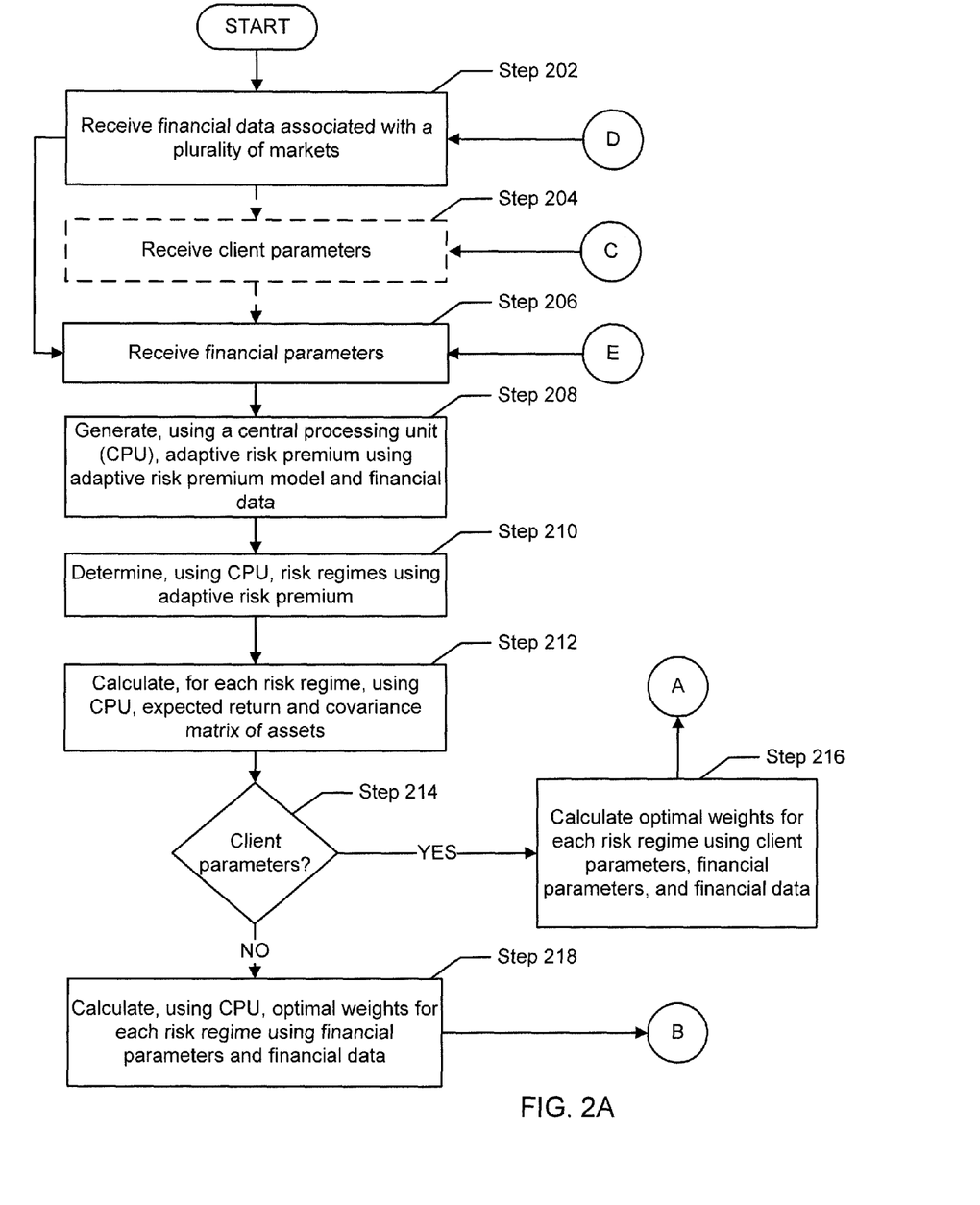
FIGS. 2A and 2B show a flowchart of a method in accordance with one or more embodiments of the invention.

In one or more embodiments of the invention, the financial data (132) stored in the storage repository (130) contains financial information received from a financial data source (156). The financial data (132) is discussed below with respect to FIG. 2. In one or more embodiments of the invention, the client parameters (134) stored in the storage repository (130) contains client parameters received from the client system (150). The client parameters (132) are discussed below with respect to FIG. 2.

In one or more embodiments of the invention, client portfolio data (136) stored in the storage repository (130) contains information associated with the client portfolio. Client portfolio data (136) may include, but is not limited to, previous portfolio transactions, previous deposits into the portfolio, and return and dividend information. In one or more embodiments of the invention, weights (138) stored in the storage repository (130) include previous weights determined for previous portfolios and/or the current portfolio of the client. The weights may be generated by the portfolio weight module (146) of the MVC module (144).

In one or more embodiments of the invention, the storage repository (130) is a persistent storage device (or set of devices) and is configured to store financial data (132), client parameters (134), client portfolio data (136), and weights (138). The storage repository (130) may also be configured to store other information, including but not limited to financial parameters. Examples of a storage repository (130) include, but are not limited to, a data base, a file system, a hard drive, some other form of data storage, or any suitable combination thereof.

In one or more embodiments of the invention, the risk regime module (108) of the risk regime application (104) is configured to coordinate the financial parameter calculator (106), the ARP model (140), the MVC module (144), and the transaction determination module (148). In one or more embodiments of the invention, the risk regime module (108) of the risk regime application (104) is configured to coordinate the transfer of financial data, client parameters, financial parameters, weights, risk regimes, transaction information, and other information related to financial investments and/or a financial portfolio between the application interface (126), the storage repository (130), and the other components of the risk regime application (104). More specifically, the risk regime module (108) may be configured to receive information related to an investment portfolio from the application interface (126) and store the information related to the investment portfolio in the storage repository (130). Further, the risk regime module (108) may be configured to retrieve information related to the investment portfolio from the storage repository (130) for use by other components of the risk regime application (104). The risk regime module (108) may also be configured to retrieve information related to the investment portfolio from the storage repository (130) to be sent to a client system (150) and/or a financial data source (156) using the application interface (126). One or more of the components (e.g., the financial parameter calculator (106), the ARP model (140), the MVC module (144)) of the risk regime application (104) may be a separate system operating as a stand-alone system independent of the other components in the risk regime application (104).

In one or more embodiments of the invention, the risk regime module (108) of the risk regime application (104) is configured to financial data, financial parameters, and, optionally, client parameters from a user system (150) and/or a financial data source (156) through the application interface (126), utilize one or more of the other components of the risk application (104) to generate an investment portfolio, and send the investment portfolio, including any recommended or executed transactions, to the user system (150) through the application interface (126). The risk regime module (108) may be configured to retrieve information (e.g., financial data (132), client parameters (134), client portfolio data (136), and weights (138)) stored in the storage repository (130). The risk regime module (108) may also be configured to store financial data (132), client parameters (134), client portfolio data (136), and weights (138) in the storage repository (130).

In one or more embodiments of the invention, the financial parameter calculator (106) of the risk regime application (104) is configured to calculate financial parameters. The financial parameters may be calculated based on financial data and/or client parameters received from a client system (150) and/or a financial data source (156) received by the risk regime module (108). The financial data and/or client parameters may also be received from financial data (132) and/or client parameters (134) stored in the storage repository (130) and retrieved by the risk regime module (108). The financial parameter calculator (106) may also be configured to process financial parameters received from client portfolio data (136) stored in the storage repository (130) and retrieved by the risk regime module (108). Further, the financial parameter calculator (106) may be configured to process financial parameters received from a client system (150) and/or a financial data source (156) using the risk regime module (108).

Financial parameters calculated and/or processed by the financial parameter calculator (106) may be used to place limitations on investment decisions that affect an investment portfolio. Examples of financial parameters include, but are not limited to a turnover constraint and a speed of adjustment. A turnover constraint may refer to a maximum portion of an entire portfolio that may be replaced over a period of time. For example, if a financial parameter is a turnover constraint of 50%, then up to half of the investments in an investment portfolio may be replaced with different investments. A speed of adjustment may refer to an amount of time to transition from a current asset mix in an investment portfolio to a desired asset mix in the investment portfolio. In one or more embodiments of the invention, the financial parameters calculated and/or processed by the financial parameter calculator (106) are sent to the risk regime module (108).

In one or more embodiments of the invention, the ARP model (140) of the risk regime application (104) is configured to generate ARPs. Specifically, the ARP model (140) may be configured to recognized long-term changes in risk appetite (i.e., risk regime, as explained below). The ARPs may be generated by the ARP generator (142). The ARP may be an indication of the amount of investment risk (i.e., risk appetite) that a client is willing to assume. The ARP may also be an indication of an amount of risk for a financial and/or investment market. The ARP may be a number, a percentage, a ranking, a category, or some other indication of a level of risk. The ARP generator (142) may use financial data and/or client parameters to generate the ARP. The ARP model (140) may receive the financial data and/or client parameters used by the ARP generator (142) from the risk regime module (108). The ARP model (140) may send the ARP generated by the ARP generator (142) to the risk regime module (108).

As an example, an ARP of a market environment may be calculated as an expected return on stocks ($R_S$) less an expected return on bonds ($R_B$). $R_S$ may be calculated using a cashflow model that utilizes the current price of the stock market and consensus expectations (as from industry analysts) of earnings and future growth to approximate the market's view on the performance fundamentals of the company stock. $R_B$ may be calculated using the current yield in the bond market to approximate the market's view on bond returns. The ARP model (140) may compare the expected risk premium ($R_S$-$R_B$) to the actual premium ($R_S$-$R_B$). The ARP model (140) may also use an error correction process to calculate a longer-term trend in the market's view of a risk premium.

The ARP model (140) may further be configured to determine regimes using the ARPs. The regimes determined by the ARP model (140) may be based on risk (i.e., an amount or possibility of harm or loss in an investment or group of investments). The risk may be related to general financial conditions and/or specific market conditions. Regimes may also be based on other factors, separate from or in conjunction with risk, including but not limited to volatility and price spreads. As a non-limiting example, risk regimes may be identified as low, normal, and high, where each risk regime matches a risk appetite that corresponds to the ARP calculated by the ARP generator (142).

The ARP model (140) may further be configured to build an investment portfolio for each determined risk regime. The ARP model (140) may also be configured to identify a current regime among the regimes that were determined. The current regime may be based, in part, on current financial data, the client parameters, and/or the financial parameters. The ARP model (140) may further be configured to determine calculated weights for each regime and/or for the current regime. With the calculated weights, optimal portfolios may be built by the ARP model (140).

The ARP model (140) may further be configured to adjust the asset weights of the current portfolio to match the calculated weights for the current risk regime. The adjusted asset weights may be called the first adjusted asset weights. Alternatively, the risk regime module (108) may be configured to receive the calculated weights from the current risk regime from the ARP model (108) and adjust the asset weights of the current portfolio to create the first adjusted asset weights. In one or more embodiments of the invention, the ARP model is used to identify long-term risk. The ARP model may be proprietary. The ARP model (140) may send the regimes, the investment portfolio, the calculated weights of each regime, and/or the optimal portfolio for each regime to the risk regime module (108).

In one or more embodiments of the invention, the MVC module (144) of the risk regime application (104) is configured to calculate the momentum, volatility, and correlation of each asset class within a portfolio. The MVC module (144) may also be configured to calculate the momentum, volatility, and correlation of each asset class within each regime. The momentum may be a momentum ranking that refers to price movement, particularly in the short term, of each asset class. Volatility may refer to uncertainty in the price of an asset class over time. Specifically, volatility may be associated with a difference between observed and expected price movements for an asset class. Correlation may refer to a degree of relationship between the actual and/or expected return of the asset class and the other asset classes in the portfolio. Those skilled in the art that correlation may also refer to a degree of relationship between the actual and/or expected return of the asset class and some other parameter, such as average return of the asset class in the marketplace. The momentum, volatility, and correlation of each asset class in the portfolio may be sent to the risk regime module (108) by the MVC module (144).

The MVC module (144) may also be configured to rank each asset class in a portfolio based on the MVC. The rank of each asset class in the portfolio may be in terms of a weight. The rank of each asset class in the portfolio may be called MVC rankings. The portfolio weight module (146) of the MVC module (144) may be configured to rank each asset class in the portfolio. For example, all else being equal, the portfolio weight module (146) may assign a higher weight to an asset class with a combination of a high momentum ranking, a low volatility, and a low correlation. Alternatively, all else being equal, the portfolio weight module (146) may assign a lower weight to an asset class with a combination of a low momentum ranking, a high volatility, and a high correlation. In one or more embodiments of the invention, due to the continuous and/or frequent monitoring of changes in financial data, financial parameters, and client parameters, the MVC module (144), using the portfolio weight module (146), allows weights assigned to each asset class to be adjusted in response to shorter term opportunities.

The MVC module (144) may further be configured to adjust, based on the MVC rankings, the first adjusted asset weights to create second adjusted asset weights. The first adjusted asset weights may be received by the MVC module (144) from the risk regime module (108). The second adjusted asset weights may be the same as the rank of each asset class in the portfolio based on the MVC. Alternatively, the second adjusted asset weights may be determined using a formula or set of formulas that incorporate the MVC rankings. The momentum, volatility, and correlation of each asset class in the portfolio may be sent to the risk regime module (108). The rank of each asset class in the portfolio and the second adjusted asset weights may be sent to the risk regime module (108) by the MVC module (144). In one or more embodiments of the invention, the risk regime module (108) is configured to adjust, based on the MVC rankings received from the MVC module (144), the first adjusted asset weights to create second adjusted asset weights.

The MVC module (144) may further be configured to determine one of the second adjusted asset weights for the current portfolio. In such a case, the second adjusted asset weight for the current portfolio is sent by the MVC module (144) to the risk regime module (108). Alternatively, the second adjusted asset weight for the current portfolio may be determined by the risk regime module (108) based on the second adjusted asset weights received from the MVC module (144).

In one or more embodiments of the invention, the transaction determination module (148) of the risk regime application (104) is configured to propose and/or execute transactions, based on the second adjusted asset weights for the current portfolio. The second adjusted asset weights and the current portfolio may be received from the risk regime module (108). The transaction determination module (148) may use historical data, forecast data, or any suitable combination thereof in identifying the appropriate asset(s) in which to propose an investment. Each asset identified by the transaction determination module (148) may be evaluated using the financial data, the financial parameters, and the client parameters. If the transaction determination module (148) determines that more information is required before proposing and/or executing transactions, the transaction determination module (148) may send a request to the risk regime module (108) to retrieve such information from the client system (150), a financial data source (156) and/or the storage repository (130). The risk regime module (108) may then send such information to the transaction determination module (148).

The transactions proposed and/or executed by the transaction determination module (148) may be for one or more asset classes in the current portfolio. A proposed transaction may be to make no change (i.e., no transaction) for the asset class.

In one or more embodiments of the invention, a proposed transaction may be sent to the risk regime module (108) for approval by the client, a portfolio manager, or some other authority. In the case of an executed transaction, the transaction determination module (148) may be configured to place the transaction order(s) with a financial data source (156) (e.g., a broker, an agent), either directly or using the risk regime module (108), using the application interface (126). In one or more embodiments of the invention, the details of each executed transaction are sent to the risk regime module (108).

In one or more embodiments of the invention, the CPU (120) of the computer system (102) is configured to execute one or more applications. Specifically, the CPU (120) may be configured to execute the risk regime application (104) and the application interface (126). The CPU (120) may be any hardware processor or integrated circuit, such as a single-core processing chip, a multi-core processing chip, or a multi-chip module containing multiple multi-core processing chips. Those skilled in the art will appreciate that the CPU (120) may be known by other names, including but not limited to a processor, a microprocessor, and a multi-core processor. In one or more embodiments of the invention, the CPU (120) is configured to execute software instructions stored in memory (122). The memory (122) may include one or more cache memories, main memory, and/or any other suitable type of memory. The memory (122) may be discretely located on the computer system (102) relative to the CPU (120). The memory (122) may also be integrated with the CPU (120).

Optionally, in one or more embodiments of the invention, the security module (128) is configured to secure interactions between the application interface (126) and the client application (152) and/or one or more financial data sources (156). More specifically, the security module (128) may be configured to authenticate communication from the applications based on security keys verifying the identity of the source of the communication. For example, the client application (152) may be associated with a security key enabling the client application (152) to interact with the application interface (126). Further, the security module (128) may be configured to restrict requests for, and access to, financial data, client parameters, client portfolio data, and/or weights. For example, the client application (152) associated with client system (150) may be restricted to only provide specific portfolio data. Further, the client application (152) associated with client system (150) may be restricted to only access client information associated with that particular client.

Those skilled in the art will appreciate that the client application (152) and/or an application from a financial data source (156) may be configured to interact with the computer system (102) using a browser extension. In this case, the browser extension may maintain an active session with the computer system (102) after the security module (128) has authenticated the client application (152) and/or an application from a financial data source (156). For example, the browser extension may continue to interact with the computer system (102) the client views various web content in the client application (152). In this example, the browser extension may receive notifications from the computer system (102) for presenting to the client on the client system (152).

Figure 2B:
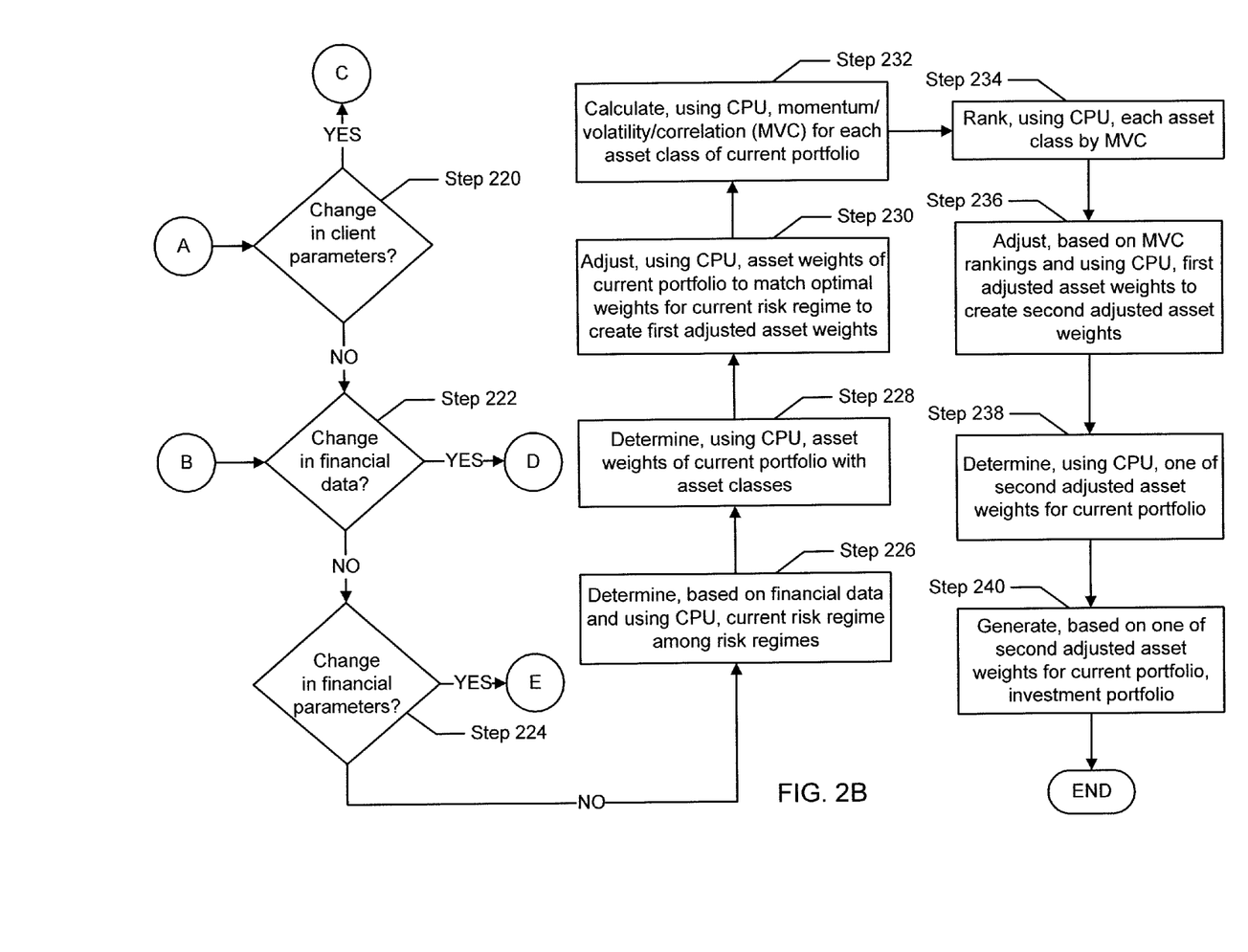

FIGS. 2A and 2B show a flowchart of a method for asset-based asset allocation in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 2A and 2B, may be included in performing this method. Accordingly, the specific arrangement of steps shown in FIGS. 2A and 2B should not be construed as limiting the scope of the invention. In one or more embodiments of the invention, a particular computing device, as described, for example, in FIG. 4 below, is used to perform one or more of the Steps described below with respect to FIGS. 2A and 2B.

Referring to FIG. 2A, in Step 202, financial data associated with a number of markets is received. In one or more embodiments of the invention, a market is a financial market. A market may include, but is not limited to, a stock market, a currency market, a bond market, or any other suitable commodities market. A market may be domestic, foreign, or international. The financial data may be a continuous stream of data or a discrete amount of data. The financial data may be historical and/or forecast. The units associated with financial data may be any unit appropriate for the data, including but not limited to currency, people, unitless (e.g., another ratio), a percentage, and jobs. Examples of financial data may include, but are not limited to, long and short U.S. treasury yields, current and estimated earnings for the S&P 500 index, the current rate of inflation (CPI), and historical returns for stocks, commodities, fixed income, real estate, and other asset classes.

In optional Step 204, client parameters are received. In one or more embodiments of the invention, the client parameters define one or more preferences and/or constraints of the client with regard to an investment portfolio of the client. Examples of a client parameter may include, but are not limited to, a maximum amount a client will invest, risk appetite, a maximum percentage of an asset class (e.g., stocks, bonds) in a client's investment portfolio, and commodities and/or companies in which a client refuses to invest. In one or more embodiments of the invention, the client parameters are used when an investment portfolio is generated for a client with particular investment requirements. Client parameters may be received through an interview process conducted with the client and/or a representative of the client. Client parameters may also be regulatory and/or tax constraints that may apply to the client and/or the portfolio.

In Step 206, financial parameters are received. In one or more embodiments of the invention, the financial parameters are constraints that apply to the model(s) used to generate the investment portfolio. Financial parameters may be calculated, created, or received from a stand-alone system and/or a third party. Examples of financial parameters include, but are not limited to, turnover constraints (i.e., how often all or part of an investment portfolio may change and/or trade) and speed of adjustment (i.e., how many elements in an investment portfolio may change in a period of time). Financial parameters may be based on a law or regulation, an internal policy, or some similar limitation.

In Step 208, an ARP is generated using an ARP model, financial data, and a central processing unit (CPU). The ARP model may be the ARP model described above with respect to FIG. 1. In one or more embodiments of the invention, the ARP model is proprietary. The ARP model may be configured to calculate risk for a given set of financial conditions. Specifically, the ARP model may be used to measure the risk appetite (i.e., an amount of investment risk a client is willing to assume in order to achieve a level of return on an investment) of the overall market. Such financial conditions may be historical, actual, projected, or any suitable combination thereof.

In Step 210, one or more risk regimes are determined using the ARP. In one or more embodiments of the invention, each risk regime corresponds to a different level or investment risk. Each risk regime may be distinct, so that there is no overlap between risk regimes. For example, three different risk regimes may be low, normal, and high risk.

In Step 212, an expected return and covariance matrix of assets is calculated for each risk regime. In one or more embodiments of the invention, the covariance matrix of assets provides a measure of a correlation between an expected return of each asset in the risk regime and the expected return of the other assets in the regime. The covariance matrix may also provide a measure of correlation between other parameters, such as the historical return of an asset and an average return (or range of returns) for the risk regime. An asset in the risk regime may be any type of investment, including but not limited to stocks, real estate, bonds, or precious metals. An asset may also be a specific investment instrument within a type of investment, such as stock for a specific company, a specific real estate investment, a particular government bond, or gold. The covariance matrix may be a mathematical matrix, a table, a list, or some other suitable format to show the correlation between the expected return of each asset in the risk regime and the acceptable return (or range of returns) for the other assets in the regime.

In Step 214, a determination is made as to whether client parameters (as in optional Step 204 above) are included in the information received. If client parameters are included in the information received, then the process proceeds to Step 216. If client parameters are not included in the information received, then the process proceeds to Step 218.

In Step 216, calculated weights for each risk regime are calculated using the client parameters, the financial parameters, and the financial data. In one or more embodiments of the invention, the calculated weights are also calculated using the covariance matrix of assets. For each risk regime, a weight may be assigned to each asset in the risk regime. The weight may be in terms of a percentage, a decimal, or some other suitable format. In one or more embodiments of the invention, the sum of the weights for a given risk regime adds to one, one hundred percent, or some equivalent amount. For example, for a medium risk regime that includes commodities, real estate, treasury inflation-protected securities (TIPS), infrastructure, and gold, the calculated weights may be calculated as 22% for commodities, 18% for real estate, 30% for TIPS, 20% for infrastructure, and 10% for gold. After completing Step 216, the process proceeds to Step 220.

In Step 218, calculated weights for each risk regime are calculated using the financial parameters and the financial data. In one or more embodiments of the invention, the calculated weights are also calculated using the covariance matrix of assets. For each risk regime, a weight may be assigned to each asset in the risk regime. The weight may be in terms of a percentage, a decimal, or some other suitable format. In one or more embodiments of the invention, the sum of the weights for a given risk regime adds to one, one hundred percent, or some equivalent amount. For example, for a high risk regime that includes commodities, real estate, treasury inflation-protected securities (TIPS), infrastructure, and gold, the calculated weights may be calculated as 30% for commodities, 22% for real estate, 20% for TIPS, 23% for infrastructure, and 5% for gold. After completing Step 218, the process proceeds to Step 222.

In Step 220, a determination is made as to whether there is a change to the client parameters. In one or more embodiments of the invention, a change in client parameters is a new or a revised client parameter. A change in client parameters may be received from the client at regular intervals, randomly, or some suitable combination thereof. A client parameter may change based on satisfaction of a condition, such as a lapse of time or the occurrence of an event. A change in client parameters may also be a change in a regulatory and/or tax constraint, as communicated by the client, a regulatory agency, a tax authority, or some other suitable entity. For example, a client that previously did not invest in commodities may now seek to invest in that asset class. If there is a change to the client parameters, then the process reverts to Step 204 to receive the new and/or revised client parameters. If there is no change to the client parameters, then the process proceeds to Step 222.

In Step 222, a determination is made as to whether there is a change in the financial data. A change in the financial data may be received from a financial data source. A change in the financial data may be received at regular intervals, randomly, or some suitable combination thereof. A change in the financial data may also be new financial data that was not previously received. A change to the financial data may be not deemed to be a change for purposes of this process unless a threshold is met. For example, it may be determined that a certain index must change at least US$0.001 from the most recent data point in order to be considered a change. Such threshold may be set by the risk regime application, a financial data source, or some other suitable entity. If there is a change to the financial data, then the process reverts to Step 202 to receive the new and/or revised financial data. If there is no change to the financial data, then the process proceeds to Step 224.

In Step 224, a determination is made as to whether there is a change in the financial parameters. A change in the financial parameters may be received from a financial data source and/or may be calculated based on a change in the financial data. A change in the financial parameters may be received at regular intervals, randomly, or some suitable combination thereof. A change in the financial parameters may also be new financial parameters that were not previously received. A change to the financial parameters may be not deemed to be a change for purposes of this process unless a threshold is met. For example, it may be determined that the speed of adjustment must change at least 0.1% from the current speed of adjustment in order to be considered a change. Such threshold may be set by the risk regime application, a financial data source, the client, or some other suitable entity. If there is a change to the financial parameters, then the process reverts to Step 206 to receive the new and/or revised financial parameters. If there is no change to the financial parameters, then the process proceeds to Step 226.

In Step 226, the current risk regime is determined, based on the financial data and using the CPU, among the risk regimes. In one or more embodiments of the invention, only one risk regime of the various risk regimes is determined or selected. The various risk regimes may be the same as the risk regimes that were determined above with respect to Step 210.

In Step 228, the asset weights of the current portfolio with the asset classes are determined. In one or more embodiments of the invention, the current portfolio is a portfolio in which the client is currently invested. The asset weights of the current portfolio may be determined by an ARP model. The asset classes of the current portfolio may be the same as, or substantially similar to, the asset classes in the current risk regime determined in Step 226.

In Step 230, the asset weights of the current portfolio are adjusted to match the calculated weights for the current risk regime to create a first set of adjusted asset weights. The calculated weights may be the same as the calculated weights that were calculated in Step 216 or Step 218, discussed above.

In Step 232, the momentum/volatility/correlation (MVC) for each asset class of the current portfolio is calculated using the CPU. In one or more embodiments, a model is used to calculate the MVC for each asset class. The model used to calculate the MVC may be a proprietary model that focuses on short-term trends that are particular to each asset class. The momentum may be a momentum ranking that refers to price movement, particularly in the short term, of each asset class. Volatility may refer to uncertainty in the price of an asset class over time. Specifically, volatility may be associated with a difference between observed and expected price movements for an asset class. Correlation may refer to a degree of relationship between the actual and/or expected return of the asset class and the other asset classes in the portfolio.

In Step 234, each asset class is ranked by MVC using the CPU. Each asset class may be ranked by momentum only, volatility only, correlation only, or by some suitable combination of the momentum ranking, volatility, and/or correlation. Ranking each asset class using the MVC may be based on a predetermined criterion, a client preference, a financial parameter, some other factor, or any suitable combination thereof. In one or more embodiments of the invention, the asset class with the highest score using the MVC ranking is ranked first among the asset classes. For example, an asset class with a high momentum ranking, low volatility, and low correlation may rank higher than an asset class with a low momentum ranking, high volatility, and high correlation.

In Step 236, the first adjusted asset weights are adjusted, based on MVC and using the CPU, to create second adjusted asset weights. In one or more embodiments of the invention, an asset class with a combination of a high momentum ranking, a low volatility, and a low correlation ranking receives a higher weight than an asset class with a low momentum ranking, a high volatility, and a high correlation. Creating a second set of adjusted asset weights for the asset classes in the risk regime may allow each asset class to fluctuate in response to (i.e., capitalize on) shorter term investment opportunities.

In Step 238, one set of the second adjusted asset weights is determined for the current portfolio using the CPU. In one or more embodiments of the invention, the current portfolio corresponds to the risk regime associated with the second adjusted asset weights. The set of the second adjusted asset weights may be different than the first adjusted asset weights for the current portfolio.

In Step 240, an investment portfolio is generated based on the second adjusted asset weights for the current portfolio. The investment portfolio may include the same asset classes as the current portfolio, where the weight of each asset class may be the same or different from the weights of the current portfolio. Alternatively, the current portfolio may include one or more asset classes that differ from the current portfolio. The investment portfolio may be actual (i.e., the transactions needed to create the investment portfolio have been executed) or proposed. A proposed investment portfolio may be subject to approval by the client, a portfolio manager, an account manager, or some other suitable authority.

The following describes an example in accordance with one or more embodiments of the invention. The example is for explanatory purposes only and is not intended to limit the scope of the invention. Terminology used in FIGS. 1 through 2B may be used in the example without further reference to FIGS. 1 through 2B.

EXAMPLE

Figure 3:
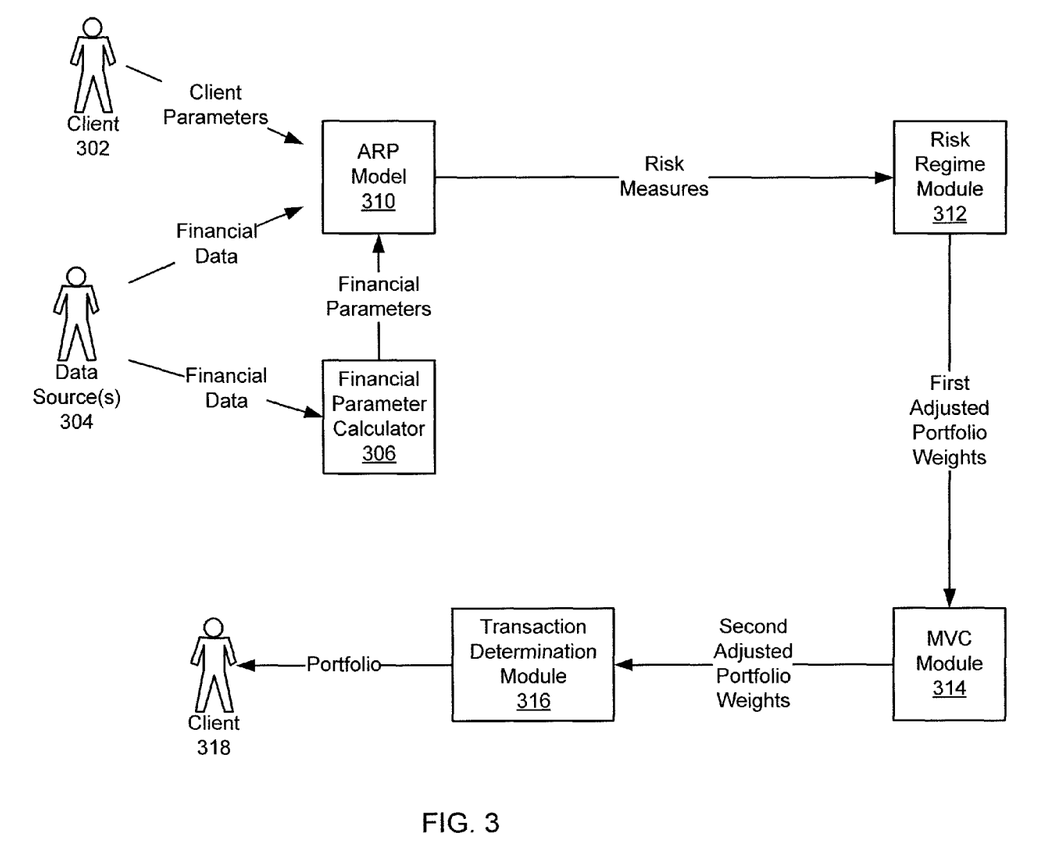
FIG. 3 shows an example using the regime-based asset allocation system in accordance with one or more embodiments of the invention.

Consider the following example, as illustrated in FIG. 3, which describes regime-based asset allocation via adaptive risk premium in accordance with one or more embodiments described above. The example shows a client (302) sends client parameters to the ARP model (310). Further, one or more data sources (304) send financial data to the ARP model (310). The one or more data sources (304) also send financial data to the financial parameter calculator (306). The financial data sent to the ARP model (310) by the one or more data sources (304) may be the same or different than the financial data sent to the financial parameter calculator (306). Alternatively, the one or more data sources (304) may send one set of financial data to the risk regime application (not shown), where the risk regime module distributes the financial data between the ARP model (310) and the financial parameter calculator (306).

The financial parameter calculator (306) receives the financial data from the one or more data sources (304) and creates financial parameters. The financial parameter calculator (306) sends the financial parameters to the ARP model (310). After receiving the financial data from the client (302) and the one or more data sources (304), the ARP model (310) generates risk measures. The risk measures may include, but are not limited to, an adaptive risk premium, a number of risk regimes, an expected return and covariance matrix of assets, and calculated weights for each risk regime. The ARP model (310) sends the risk measures to the risk regime module (312).

After receiving the risk measures from the ARP model (310), the risk regime module (312) determines a first set of adjusted asset weights for the current regime. Specifically, the risk regime module (312) may use the risk measures to adjust the asset weights of the current portfolio to match the calculated weights for the current risk regime to create a first set of adjusted asset weights. The first set of adjusted asset weights for the current portfolio may also be called the first adjusted portfolio weights. The first adjusted portfolio weights are sent by the risk regime module (312) to the MVC module (314).

After receiving the first adjusted portfolio weights from the risk regime module (312), the MVC module (314) calculates the momentum, volatility, and correlation for each asset class in the current portfolio. Using the momentum, volatility, and correlation for each asset class, the MVC module (314) then ranks each asset class in the current portfolio. Based on the ranking of the asset classes, the MVC module (314) then adjusts the first adjusted portfolio weights to create a second set of adjusted asset weights. The second set of adjusted asset weights may also be called the second adjusted portfolio weights. The second adjusted portfolio weights are sent by the MVC module (314) to the transaction determination module (316).

After receiving the second adjusted portfolio weights from the MVC module (314), the transaction determination module (316) generates a portfolio. The portfolio generated by the transaction determination module (316) may include one or more potential transactions that satisfy the requirements of the risk regime for the portfolio, as determined by the ARP model and the MVC module using the financial data, the client parameters, and the financial parameters. The potential transactions may be for one or a number of asset classes. The portfolio of potential transactions is then sent to the client (318). In one or more embodiments of the invention, the portfolio of potential transactions is approved by the client (318) before being executed. Alternatively, the portfolio sent to the client includes transactions that are identified and executed using the transaction determination module (316).

Embodiments of the invention are designed to improve diversification through adaptive allocations. Specifically, embodiments of the invention analyze data (e.g., financial data, client parameters, financial parameters) to establish a set of risk regimes, identify a risk regime that, either periodically or continuously, Embodiments of the invention seek to achieve higher risk-adjusted returns over a specified benchmark. A conventional approach to investments is to determine appropriate long-term weightings of assets for a given client portfolio. These long-term weightings may often be referred to as the portfolio's strategic asset allocation guidelines. An example of strategic asset allocation guidelines is a portfolio that invests 60% of its assets in stocks and 40% in bonds. As part of the conventional approach, the asset weights of the portfolio may be kept within specified ranges to meet strategic asset allocation guidelines. Key to achieving attractive risk-adjusted returns using the conventional approach is to estimate the expected returns for each asset class as well as the respective risk level (such as volatility of returns) and how returns fluctuate in relation to other asset classes. The conventional approach uses statistical analysis of data over long periods of time to estimate factors such as return, risk, and correlations. These capital market assumptions under the conventional approach may then be used to construct their strategic asset allocation guidelines, which can remain static for an indefinite period of time. The conventional approach of broadly diversifying portfolios into non-traditional assets showed serious shortcomings during the financial crises of 2008, where many portfolios suffered poor performance even though they seemed to be well diversified. One of the causes to the poor performance was that the correlations among many of the assets rose dramatically above historical norms, thus failing to provide the diversification that would have normally occurred.

Embodiments of the invention provide for a new and improved method and system of creating and maintaining an investment portfolio compared to the conventional approach described above. Embodiments of the invention are based on the premise that effective diversification depends on, among other factors, correlations between asset classes. Specifically, asset classes may provide better diversification when they have a low correlation to stocks and to each other, and correlations may change depending on the investment environment. In order to provide effective diversification, allocations may need to adapt to the current environment. Thus, embodiments of the invention identify how returns and correlations behave in different environments (i.e., regimes) and dynamically adjust allocations (i.e., weights) between asset classes based on the prevailing regime. Consequently, attractive risk adjusted performance is achieved.

The effectiveness of embodiments of the invention may be exemplified in results of one or more statistical comparisons with historical performance of investment methods known in the art. For example, a simulated performance of embodiments of the invention was constructed from March 1995 through July 2010. The table below shows an example of improved performance, including an improved return and lower volatility, using embodiments of the invention compared to performance of a benchmark. Those skilled in the art will appreciate that actual results may vary depending on a number of factors, including but not limited to the time frame under consideration and the benchmark.

|  | Embodiments of the invention | Benchmark |
| --- | --- | --- |
| Annualized return | 11.09% | 9.28% |
| Volatility | 8.97% | 10.63% |

-continued

|  | Embodiments of the invention | Benchmark |
| --- | --- | --- |
| Sharpe Ratio | 0.87 | 0.56 |
| Maximum drawdown | −23.22% | −38.65% |
| Correlation to S&P 500 | 0.49 | 0.66 |
| Average Annual Turnover | 34.60% |  |

The benchmark consists of 25% real estate, 25% TIPS, 25% infrastructure, 20% commodities, and 5% gold. The annualized return is expressed before fees and transaction costs. The simulated performance of embodiments of the invention is constructed by rebalancing proposed strategic guidelines on a monthly basis using historical performances of the respective indices. The Sharpe Ratio is a measure of risk-adjusted performance and is calculated by subtracting the risk-free rate of return from the rate of return for a portfolio and dividing the result by the standard deviation of the portfolio returns. The maximum drawdown is the peak-to-trough decline during a specific record period of an investment. A drawdown is usually quoted, as in this case, as the percentage between the peak and the trough.

Embodiments of the invention may be used in a number of portfolio management applications. For example, embodiments of the invention may be used to manage broadly diversified asset allocation portfolios. Further, embodiments of the invention may be used to manage fund-of-funds asset allocation portfolios. Also, embodiments of the invention may be used to manage asset allocation portfolios that invest only in non-traditional asset classes, such as commodities, TIPS, real estate, and hedge funds. Further, embodiments of the invention may be used to specify asset allocation model portfolios for investment platforms.

Figure 4:
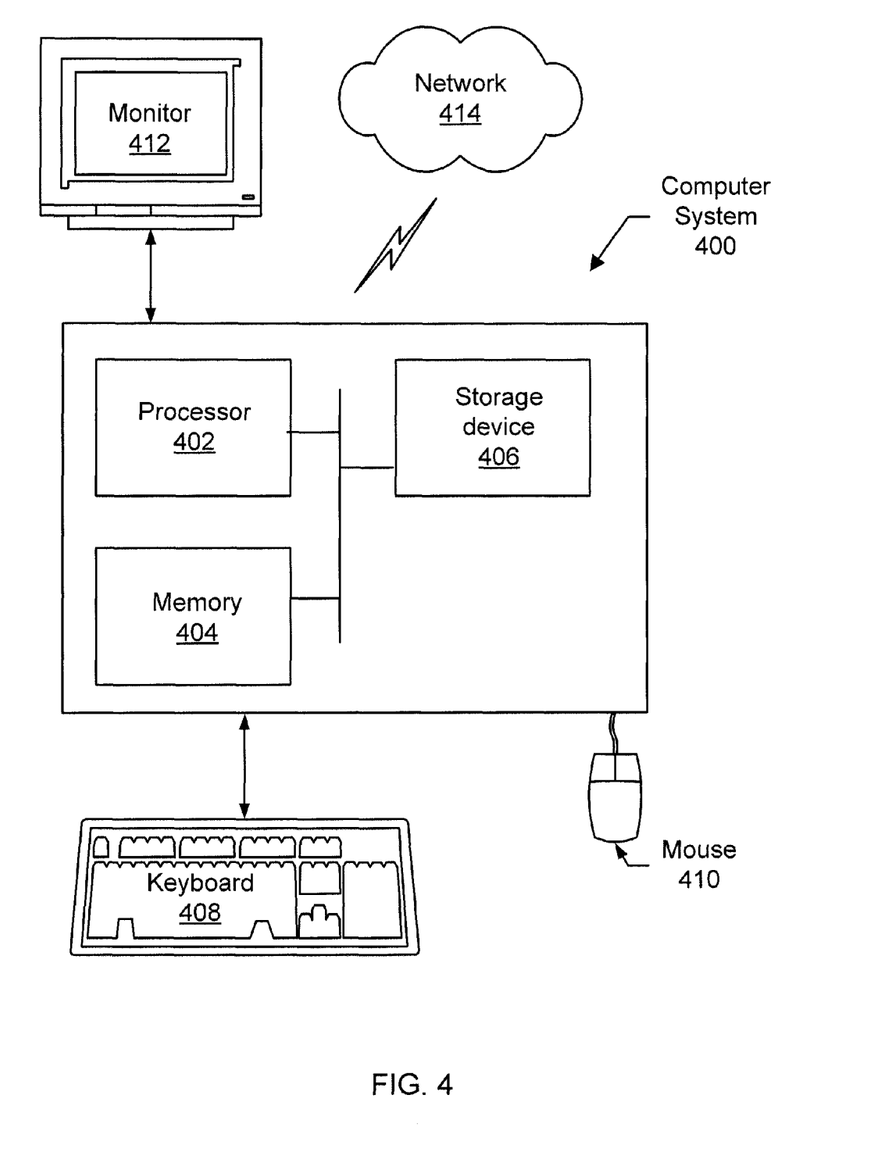
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a CPU, integrated circuit, or other hardware processor(s), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., result module, evaluation module) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a regime-based asset allocation via an adaptive risk premium, the method comprising:
receiving a plurality of financial data associated with a plurality of financial markets;
receiving a plurality of financial parameters;
generating, based on the plurality of financial data and using a central processing unit (CPU), an adaptive risk premium using an adaptive risk premium model;
determining, using the CPU and based on the adaptive risk premium, a high risk regime comprising high risk regime expected returns and a high risk regime covariance matrix of assets;
determining, using the CPU and based on the adaptive risk premium, a normal risk regime comprising normal risk regime expected returns and a normal risk regime covariance matrix of assets;
determining, by the CPU and based on the adaptive risk premium, a low risk regime comprising low risk regime expected returns and a low risk regime covariance matrix of assets;
calculating a plurality of calculated weights for the high risk regime, the normal risk regime, and the low risk regime using the plurality of financial parameters and the plurality of financial data;
obtaining a current portfolio;
identifying, based on the plurality of financial data and using the CPU, a current risk regime corresponding to the current portfolio, wherein the current risk regime is one selected from a group consisting of the high risk regime, the normal risk regime, and the low risk regime;
determining, using the CPU, a plurality of asset weights of the current portfolio comprising a plurality of asset classes;
adjusting, using the CPU, the plurality of asset weights of the current portfolio to match the plurality of calculated weights for the current risk regime to create a first adjusted plurality of asset weights;
calculating a momentum, volatility, and a correlation (MVC) for each asset class of the plurality of asset classes of the current portfolio;
ranking, using the CPU, each asset class of the current portfolio by the MVC;
adjusting, based on the MVC and using the CPU, the first plurality of adjusted asset weights of the current portfolio to create a second plurality of adjusted asset weights;
determining, using the CPU, one of the second plurality of adjusted asset weights for the current portfolio; and
generating an investment portfolio based on the one of the second plurality of adjusted asset weights for the current portfolio.

2. The method of claim 1, further comprising:
determining a plurality of transactions to satisfy the investment portfolio; and
generating a plurality of transaction orders to execute the plurality of transactions.

3. The method of claim 1, wherein the financial data is actual, historical data.

4. The method of claim 1, further comprising:
receiving a plurality of client parameters, wherein the client parameters are used to calculate the calculated weights for each risk regime.

5. The method of claim 4, further comprising:
receiving revised client parameters; and
generating a revised investment portfolio based on the revised client parameters.

6. The method of claim 1, further comprising:
receiving revised financial data; and
generating a revised investment portfolio based on the revised financial data.

7. The method of claim 1, wherein the plurality of financial parameters is received upon calculating the plurality of financial parameters for each risk regime using the expected return and the covariance matrix of assets.

8. A system for identifying a regime-based asset allocation via an adaptive risk premium (ARP), the system comprising:
a memory configured to store software instructions;
a central processing unit (CPU) configured to execute the software instructions;
a risk regime module configured to execute on the CPU and adapted with functionality to:
receive a plurality of financial data from a plurality of financial data sources,
determine, based on an adaptive risk premium, a low risk regime comprising low risk regime returns and a low risk regime covariance matrix of assets,
determine, based on the adaptive risk premium, a normal risk regime comprising normal risk regime expected returns and a normal risk regime covariance matrix of assets,
determine, based on the adaptive risk premium, a high risk regime comprising high risk regime expected returns and a high risk regime covariance matrix of assets,
calculate a plurality of calculated weights for each risk regime of the plurality of risk regimes using a plurality of financial parameters and the plurality of financial data,
determine, based on the plurality of financial data, a current risk regime of the plurality of risk regimes,
determine a plurality of asset weights of a current portfolio,
adjust the plurality of asset weights of the current portfolio to match the plurality of calculated weights of the current risk regime to create a first plurality of adjusted asset weights,
determine one of a second plurality of adjusted asset weights for the current portfolio, and
generate, based on the one of the second plurality of adjusted asset weights for the current portfolio, an investment portfolio;
an ARP model comprising an ARP generator configured to execute on the CPU and adapted with functionality to:
receive the plurality of financial data from the risk regime module, generate the adaptive risk premium using the plurality of financial data, and send the adaptive risk premium to the risk regime module;

a financial parameter calculator configured to execute on the CPU and adapted with functionality to:

calculate the plurality of financial parameters for each risk regime of the plurality of risk regimes, and send the plurality of financial parameters to the risk regime module; and a momentum, volatility, and correlation (MVC) module comprising a portfolio weight module and configured to execute on the CPU and adapted with functionality to:

calculate MVC for each asset class of the current portfolio, rank each asset class by the MVC, adjust, based on ranking each asset class by the MVC and using the portfolio weight module, the first plurality of adjusted asset weights to create the second plurality of adjusted asset weights, and send the second plurality of adjusted asset weights to the risk regime module.

9. The system of claim 8, wherein the risk regime module is further configured to execute on the CPU and adapted with functionality to:

receive a plurality of client parameters, wherein the client parameters are used to calculate the calculated weights for each risk regime.

10. The system of claim 9, wherein the risk regime module is further configured to execute on the CPU and adapted with functionality to:

receive revised client parameters; and generate, based on the revised client parameters, a revised investment portfolio.

11. The system of claim 8, wherein the risk regime module is further configured to execute on the CPU and adapted with functionality to:

receive revised financial data; and generate, based on the revised financial data, a revised investment portfolio.

12. The system of claim 8, further comprising:

a transaction determination module configured to execute on the CPU and adapted with functionality to:

determine a plurality of transactions to satisfy the investment portfolio, and generate a plurality of transaction orders to execute the plurality of transactions.

13. The system of claim 8, wherein the system further comprises:

a storage repository configured to store the plurality of financial data, the plurality of asset weights, and the first and second plurality of adjusted asset weights.

14. The system of claim 8, wherein the plurality of financial parameters is received upon calculating the plurality of financial parameters for each risk regime using the expected return and the covariance matrix of assets.

15. A computer readable storage medium comprising computer readable program code embodied therein for performing a method of identifying a regime-based asset allocation via an adaptive risk premium, the method comprising:

receiving a plurality of financial data associated with a plurality of financial markets;

receiving a plurality of financial parameters;

generating, based on the plurality of financial data, an adaptive risk premium using an adaptive risk premium model;

determining, based on the adaptive risk premium, a low risk regime comprising low risk regime expected returns and a low risk regime covariance matrix of assets;

determining, based on the adaptive risk premium, a normal risk regime comprising normal risk regime expected returns and a normal risk regime covariance matrix of assets;

determining, based on the adaptive risk premium, a high risk regime comprising high risk regime expected returns and a high risk regime covariance matrix of assets;

calculating a plurality of calculated weights for each risk regime using the plurality of financial parameters and the plurality of financial data;

determining, based on the plurality of financial data and using the CPU, a current risk regime of the plurality of risk regimes;

determining a plurality of asset weights of a current portfolio comprising a plurality of asset classes;

adjusting the plurality of asset weights of the current portfolio to match the plurality of calculated weights for the current risk regime to create a first adjusted plurality of asset weights;

calculating a momentum, volatility, and a correlation (MVC) for each asset class of the plurality of asset classes of the current portfolio;

ranking each asset class of the current portfolio by the MVC;

adjusting, based on the MVC, the first plurality of adjusted asset weights of the current portfolio to create a second plurality of adjusted asset weights;

determining one of the second plurality of adjusted asset weights for the current portfolio; and generating, based on the one of the second plurality of adjusted asset weights for the current portfolio, an investment portfolio.

16. The computer readable storage medium of claim 15, further comprising:

determining a plurality of transactions to satisfy the investment portfolio; and generating a plurality of transaction orders to execute the plurality of transactions.

17. The computer readable storage medium of claim 15, further comprising:

receiving a plurality of client parameters, wherein the client parameters are used to calculate the calculated weights for each risk regime.

18. The computer readable storage medium of claim 15, further comprising:

receiving revised client parameters; and generating, based on the revised client parameters, a revised investment portfolio.

19. The computer readable storage medium of claim 15, further comprising:

receiving revised financial data; and generating, based on the revised financial data, a revised investment portfolio.

20. The computer readable storage medium of claim 15, wherein the plurality of financial parameters is received upon calculating the plurality of financial parameters for each risk regime using the expected return and the covariance matrix of assets.

* * * * *